(12) United States Patent
Girard et al.

(10) Patent No.: US 9,045,052 B2
(45) Date of Patent: Jun. 2, 2015

(54) PARALLEL CONFIGURATION OF SERIES CELLS WITH SEMICONDUCTOR SWITCHING

(71) Applicants: Robert Bosch GmbH, Stuttgart (DE); Samsung SDI Co., Ltd., Yongin-si, Gyeonggi-do (KR)

(72) Inventors: Gregory J. Girard, Clio, MI (US); Nick Karditsas, Lake Orion, MI (US); John Collier, Orion, MI (US)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 13/663,686

(22) Filed: Oct. 30, 2012

(65) Prior Publication Data

US 2013/0106178 A1  May 2, 2013

Related U.S. Application Data

(60) Provisional application No. 61/553,654, filed on Oct. 31, 2011.

(51) Int. Cl.
*H02J 1/00* (2006.01)
*B60L 11/18* (2006.01)
(Continued)

(52) U.S. Cl.
CPC ............... *B60L 11/1853* (2013.01); *B60L 1/00* (2013.01); *Y02T 10/7005* (2013.01); *B60L 3/0046* (2013.01); *B60L 3/04* (2013.01);
(Continued)

(58) Field of Classification Search
CPC ............. B60L 11/18; B60L 1/08; B60L 3/00; B60L 1/00; H02H 7/00; H01M 10/44; H02J 1/00
See application file for complete search history.

(56) References Cited

U.S. PATENT DOCUMENTS 4,962,462 A * 10/1990 Fekete .......................... 700/297
5,631,534 A    5/1997 Lewis
(Continued)

FOREIGN PATENT DOCUMENTS

DE   102007047713      4/2009
DE   10 2009 035 483 A1   2/2011
(Continued)

OTHER PUBLICATIONS

International Search Report and Written Opinion in corresponding PCT application (i.e., PCT/US2012/062573), mailed Aug. 27, 2013 (10 pages).
(Continued)

*Primary Examiner* — Jared Fureman
*Assistant Examiner* — Terrence Willoughby
(74) *Attorney, Agent, or Firm* — Maginot Moore & Beck LLP

(57) ABSTRACT

A battery pack for an electric vehicle includes a first battery arranged in parallel with a load of the electric vehicle. A second battery is arranged in parallel with the first battery and the load. A first semiconductor switching module is arranged in series with the first battery and is arranged to selectively allow current flow from the first battery to the load and from the load to the first battery. A second semiconductor switching module is arranged in series with the second battery and is arranged to selectively allow current flow from the second battery to the load and from the load to the second battery. A battery control module selectively turns on and off the first semiconductor switching module and the second semiconductor switching module.

18 Claims, 4 Drawing Sheets

(51) Int. Cl.
  *B60L 1/00*       (2006.01)
  *B60L 3/00*       (2006.01)
  *B60L 3/04*       (2006.01)
  *H01M 10/44*      (2006.01)
  *H02J 7/00*       (2006.01)
  *H01M 10/48*      (2006.01)

(52) U.S. Cl.
  CPC ........ *B60L 11/1803* (2013.01); *B60L 11/1816* (2013.01); *B60L 11/1864* (2013.01); *B60L 11/1874* (2013.01); *B60L 11/1875* (2013.01); *H01M 10/441* (2013.01); *H02J 7/0016* (2013.01); *H02J 7/0021* (2013.01); *B60L 2240/545* (2013.01); *B60L 2240/547* (2013.01); *B60L 2240/549* (2013.01); *H01M 10/482* (2013.01); *H01M 2220/20* (2013.01); *Y02T 10/7061* (2013.01); *Y02T 90/14* (2013.01); *Y02T 10/7055* (2013.01)

(56) References Cited

U.S. PATENT DOCUMENTS

| | | | |
|---|---|---|---|
| 5,760,570 A | 6/1998 | Nagai et al. | |
| 5,804,973 A | 9/1998 | Shinohara et al. | |
| 5,883,495 A | 3/1999 | Smith et al. | |
| 5,977,751 A | 11/1999 | Blessing et al. | |
| 6,130,813 A | 10/2000 | Kates et al. | |
| 6,140,799 A * | 10/2000 | Thomasson | 320/117 |
| 6,150,795 A | 11/2000 | Kutkut et al. | |
| 6,157,165 A | 12/2000 | Kinoshita et al. | |
| 6,204,633 B1 | 3/2001 | Kitagawa | |
| 6,437,538 B1 | 8/2002 | Tsurumi et al. | |
| 6,741,065 B1 | 5/2004 | Ishii et al. | |
| 6,977,513 B2 | 12/2005 | Matsunaga | |
| 7,245,108 B2 | 7/2007 | Chertok et al. | |
| 7,304,402 B2 | 12/2007 | Osawa et al. | |
| 7,352,154 B2 | 4/2008 | Cook | |
| 7,463,009 B2 | 12/2008 | Chang et al. | |
| 7,535,200 B2 | 5/2009 | Chang et al. | |
| 7,737,660 B2 | 6/2010 | Yun | |
| 7,737,664 B2 | 6/2010 | Matsunaga | |
| 7,956,488 B2 | 6/2011 | Kobayashi et al. | |
| 8,008,890 B2 | 8/2011 | Lee et al. | |
| 2004/0155627 A1 | 8/2004 | Stanesti et al. | |
| 2007/0247106 A1 * | 10/2007 | Kawahara et al. | 320/104 |
| 2009/0066291 A1 | 3/2009 | Tien et al. | |
| 2009/0325056 A1 | 12/2009 | Greening et al. | |
| 2010/0079108 A1 | 4/2010 | Monden et al. | |
| 2010/0315043 A1 | 12/2010 | Chau | |
| 2011/0025124 A1 | 2/2011 | Brabec | |
| 2011/0025125 A1 | 2/2011 | Brabec | |
| 2011/0169448 A1 | 7/2011 | Ichikawa | |
| 2012/0293112 A1 | 11/2012 | Suzuki | |

FOREIGN PATENT DOCUMENTS

| | | |
|---|---|---|
| DE | 10 2010 027 856 A1 | 10/2011 |
| EP | 1 837 944 A2 | 9/2007 |
| EP | 2 068 417 A1 | 6/2009 |
| JP | 2001111403 A | 4/2001 |
| JP | 2005168259 A | 6/2005 |
| WO | WO2010087608 | 8/2010 |
| WO | WO2011/074390 A1 | 6/2011 |

OTHER PUBLICATIONS

Notification of Transmittal of The International Search Report and The Written Opinion of The International Searching Authority, or The Declaration dated Apr. 17, 2013 in reference to PCT/US2012/062568 (13 pgs).

* cited by examiner

PARALLEL CONFIGURATION OF SERIES CELLS WITH SEMICONDUCTOR SWITCHING

CROSS-REFERENCE TO RELATED APPLICATIONS

This application claims the benefit of U.S. Provisional Application No. 61/553,654, filed on Oct. 31, 2011 and is related to U.S. patent application Ser. No. 13/663,679, filed on Oct. 30, 2012. The entire disclosures of the above applications are incorporated herein by reference.

FIELD

The present disclosure relates to semiconductor switching of batteries within a battery pack of an electric vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEV), plug-in HEVs, electric vehicles (EV), heavy duty vehicles (HDV), and vehicles with 42-volt electrical systems. Exemplary stationary applications include backup power for telecommunications systems, uninterruptible power supplies (UPS), and distributed power generation applications.

Examples of the types of batteries that are used include nickel metal hydride (NiMH) batteries, lead-acid batteries, lithium batteries, lithium-ion batteries, and other types of batteries. A battery system may include a plurality of battery subpacks that are connected in series and/or in parallel. The battery subpacks may include a plurality of batteries that are connected in parallel and/or in series.

SUMMARY

A battery pack for an electric vehicle includes a first battery arranged in parallel with a load of the electric vehicle. A second battery is arranged in parallel with the first battery and the load. A first semiconductor switching module is arranged in series with the first battery and is arranged to selectively allow current flow from the first battery to the load and from the load to the first battery. A second semiconductor switching module is arranged in series with the second battery and is arranged to selectively allow current flow from the second battery to the load and from the load to the second battery. A battery control module selectively turns on and off the first semiconductor switching module and the second semiconductor switching module.

A method of operating a battery pack for an electric vehicle includes arranging a first battery in parallel with a load of the electric vehicle, arranging a second battery in parallel with the first battery and the load, arranging a first semiconductor switching module in series with the first battery to selectively allow current flow from the first battery to the load and from the load to the first battery, arranging a second semiconductor switching module in series with the second battery to selectively allow current flow from the second battery to the load and from the load to the second battery, and selectively turning on and off the first semiconductor switching module and the second semiconductor switching module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An electric vehicle is powered by a battery (i.e., a battery pack or system that includes a plurality of batteries or subpacks) according to the principles of the present disclosure. The batteries are connected in parallel with each other and a load (e.g., one or more electrically powered functions of the electric vehicle) to provide current and/or voltage to the load. Each of the batteries is arranged in series with, for example only, a semiconductor switching module such as one or more semiconductor devices arranged to allow bi-directional current flow to and/or from the batteries. For example, each of the semiconductor devices may be connected in parallel with one or more respective diodes. Accordingly, in a first state, each battery may be individually charged (e.g., via the load) via a respective one of the switching modules. Conversely, in a second state, each battery may be allowed to discharge (i.e., power the load) individually via the respective one of the switching modules.

Figure 1:
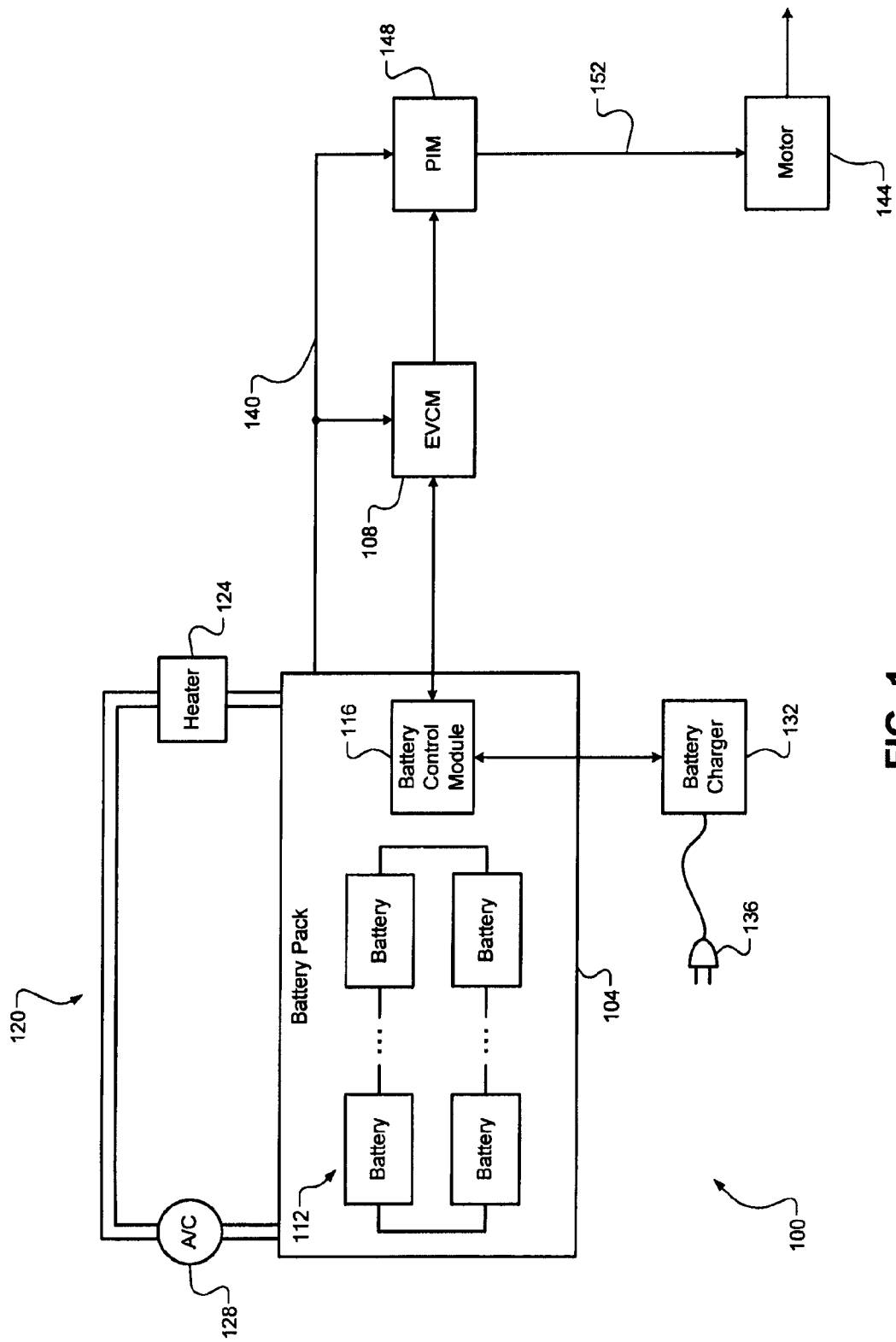
FIG. 1 is a functional block diagram of an electric vehicle according to the principles of the present disclosure.

Referring now to FIG. 1, an electric vehicle 100 includes a battery pack 104 and an electric vehicle control module (EVCM) 108. The battery pack 104 includes a plurality of batteries 112 and a battery control module 116. The battery control module 116 controls various functions of the battery pack 104 and monitors and collects various characteristics of the battery pack 104. For example, the battery control module 116 monitors characteristics including, but not limited to, voltage, current, and temperature associated with the battery pack 104. The battery control module 116 may determine performance variables of the battery pack 104 based on the characteristics. For example only, the battery control module 116 may estimate a state of charge (SOC) of the battery pack 104 based on the voltage, current, and temperature of the battery pack 104. The battery control module 116 may also determine an age of the battery pack 104 (e.g., ages of the batteries 112), and beginning of life (BOL) and/or end of life (EOL) information (and battery performance limitations associated with the BOL and/or EOL information) based on the age.

The battery control module 116 may initiate heating and/or cooling of the battery pack 104 based on the temperature. For example, a coolant system 120 may provide liquid coolant that flows through the battery pack 104 to heat and cool the battery pack 104. The coolant system 120 may include a heater 124 that heats the coolant when the temperature of the battery pack 104 is less than a low temperature threshold, and an air conditioner/compressor 128 that cools the coolant when the temperature of the battery pack 104 is greater than a high temperature threshold. Alternatively, instead of a compressor, the coolant system 120 may include any other coolant device suitable to chill the coolant, such as a thermoelectric cooler.

The battery control module 116 may communicate with a battery charger 132 (e.g., a battery charger of an electric or plug-in hybrid vehicle). The battery charger 132 charges the battery pack 104 and may include a user interface (not shown) for providing visual indications (e.g., via a display) of the condition of the battery pack 104 (e.g., the SOC of the battery pack 104). The battery charger 132 includes a plug 136 that interfaces with a power source (not shown) to provide charging power to the battery pack 104 via the battery charger 132.

The EVCM 108 communicates with the battery pack 104 and the battery control module 116 to control various functions of the vehicle 100. For example, the EVCM 108 receives voltage 140 from the battery pack 104. Conversely, the EVCM 108 receives information from the battery control module 116 related to, for example only, the monitored characteristics of the battery pack 104 and functions of the battery control module 116, the coolant system 120, and the battery charger 132.

The EVCM 108 controls a motor 144 of the vehicle 100 via a power inverter module (PIM) 148. The PIM 148 converts direct current (DC) voltage (e.g., the voltage 140) to alternating current (AC) voltage 152 and provides the AC voltage 152 to the motor 144. The motor 144 provides rotational force to drive wheels (not shown) of the vehicle 100. Alternatively, the motor 144 may be implemented as a DC motor, and the PIM 148 may be replaced by a motor controller that provides a DC voltage to the motor 144.

The batteries 112 are arranged in a parallel configuration within the battery pack 104. The battery control module 116 (and/or the EVCM 108 or other suitable components of the electric vehicle 100) implements semiconductor switching systems and methods according to the principles of the present disclosure to individually control charging and discharging of each of the batteries 112.

Figure 2:
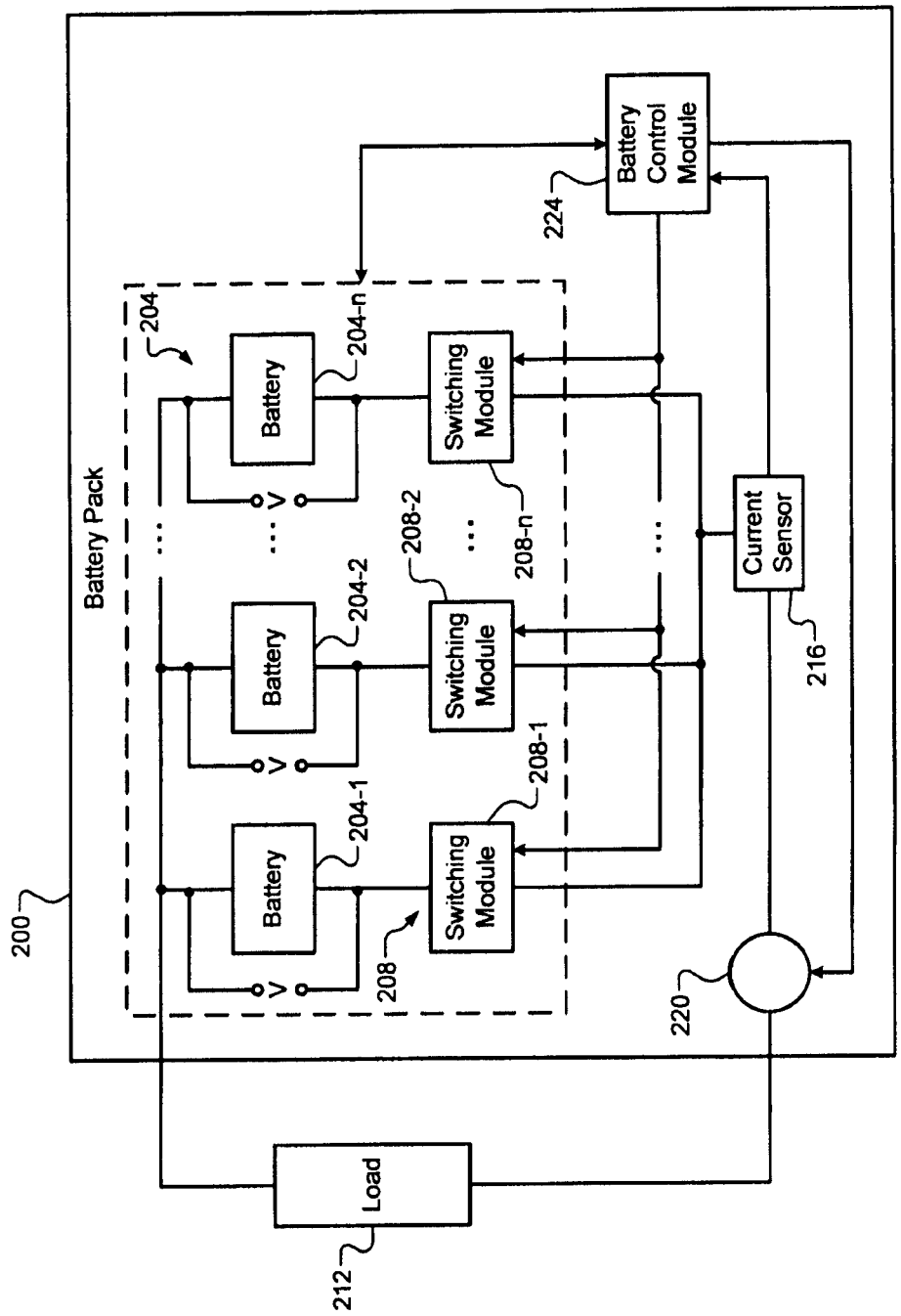
FIG. 2 is a functional block diagram of a battery pack according to the principles of the present disclosure.

Referring now to FIG. 2, a battery pack 200 according to the principles of the present disclosure includes batteries 204-1, 204-2, . . . , and 204-n, referred to collectively as batteries 204. Each of the batteries is connected in series with a corresponding one of semiconductor switching modules 208-1, 208-2, . . . , and 208-n, referred to collectively as switching modules 208. Although only one of the batteries 204 is shown in series with each of the switching modules 208, two or more of the batteries 204 can be connected in series with the respective one of the switching modules 208. The batteries 204 (and the corresponding switches 208) are connected in parallel with each other and a load 212. A current sensor 216 (e.g., a hall or shunt current sensor) is connected in series with the batteries 204, the switching modules 208, the load 212, and a contactor 220 (e.g., an air gap switch).

The switching modules 208 allow bi-directional current flow to and/or from respective ones of the batteries 204. For example, a battery control module 224 controls the switching modules 208, individually, to selectively charge the respective batteries 204 via the load 212, and to selectively discharge the respective batteries 204 to power the load 212. The battery control module 224 controls the switching modules 208 according to various characteristics of the batteries 204, the battery pack 200, the load 212, and/or any other characteristics of the electric vehicle 100. For example, the battery control module 224 monitors a current through the batteries 204 (e.g., using the current sensor 216) and/or respective voltages of the batteries 204 (e.g., via a high impedance voltage sensor or by calculating the voltage according to the sensed current). Respective polarities of the voltages and currents may be indicative of whether the batteries 204 are charging or discharging. The battery control module 224 selectively operates the switching modules 208 based in part on the current and/or the voltages, as well as the respective polarities. The battery control module 224 may also selectively operate the contactor 220 (i.e., open and close the contactor to, respectively, allow and interrupt current flow to and from the load 212).

Figure 3B:
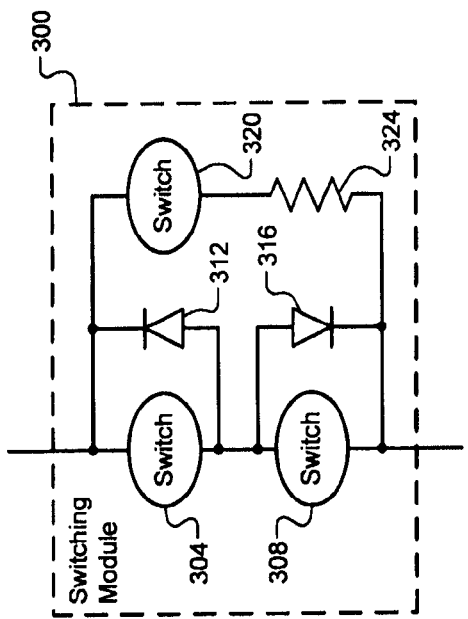
FIGS. 3A and 3B are functional block diagrams of example switching modules according to the principles of the present disclosure.
Figure 3A:
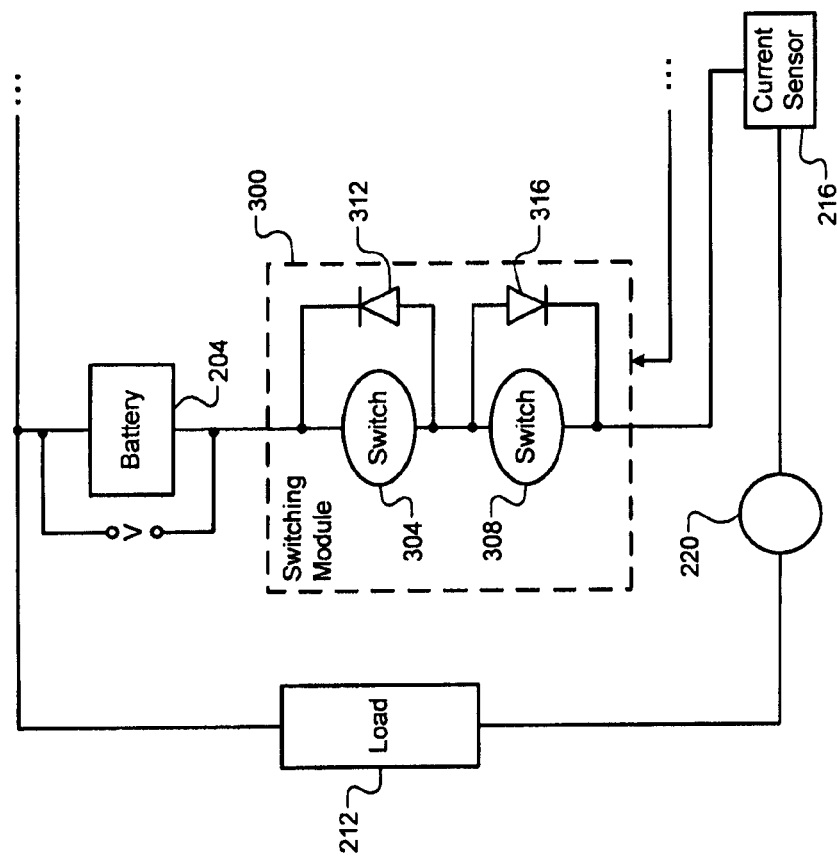

Referring now to FIGS. 3A and 3B, an example semiconductor switching module 300 is shown in detail. The switching module 300 includes a first semiconductor switch 304, a second semiconductor switch 308, a first diode 312, and a second diode 316. For example only, each of the first semiconductor switch 304 and the second semiconductor switch 308 may include any suitable transistor. The battery control module 224 as shown in FIG. 2 individually controls each of the semiconductor switches 304 and 308. The battery control module 224 selectively opens (i.e., turns OFF) and closes (i.e., turns ON) the semiconductor switches 304 and 308 to transition the battery 204 and the switching module 300 between respective states, including, for example only, a charge state, a discharge state, and/or a stop state.

In some implementations, the switching module 300 includes a pre-charge semiconductor switch 328 (e.g., any suitable transistor) and a pre-charge resistor 324 as shown in FIG. 3B. Accordingly, the switching module 300 may include a pre-charge state. The pre-charge switch 328 and resistor 324 can be implemented in any one or more of the switching modules 300. The battery control module 224 selectively initiates a pre-charge cycle corresponding to the pre-charge state (e.g., if a negative contactor of the battery pack 200 is closed). To operate the pre-charge cycle, the battery control module 224 opens (i.e., turns OFF) the switches 304 and 308, closes the negative contactor of the battery pack 200, and closes (i.e., turns ON) the pre-charge semiconductor switch 328. The pre-charge resistor 324 limit a current flowing through the switch 328 to a desired amount.

After a predetermined pre-charge time, the battery control module 224 opens (i.e., turns OFF) the switch 328 to transition from the pre-charge state to another one of the respective states. Further, during the pre-charge state, the battery control module 224 may open the contactor 220 to terminate pre-charging if either of the sensed current or sensed voltage is determined to be outside of a predetermined acceptable range.

For example only, after the pre-charge state, the battery control module 224 transitions to the discharge state. In the discharge state, the battery control module 224 turns the semiconductor switch 304 ON and the semiconductor switch 308 OFF, and current is able to flow from the battery 204 to the load 212 through the switching module 208 (i.e., through the semiconductor switch 304 and the diode 316). Accordingly, in the discharge state, the batteries 204 are used to provide power to the load 212. The amount of power is determined based on, for example, a number of the batteries 204 per string (i.e., per series connection of one or more batteries with one of the switching modules 300), and a number of the parallel batteries 204 that are active (i.e., that are in the discharge state).

While in the discharge state, the battery control module 224 continues to monitor current and/or voltage, and may selectively shut down one or more strings (e.g., turn off all semiconductor switches corresponding to one or more of the batteries 204, and/or open the contactor 220) if the current and/or voltage are determined to be outside of one or more predetermined ranges. For example, if the current and/or voltage are outside of a first predetermined range, the battery control module 224 may simply shut down one or more of the batteries 204 (i.e., a switching module 300 corresponding to one of the batteries 204). Conversely, if the current and/or voltage are outside of a second predetermined range (e.g., that is greater than the first predetermined range), the battery control module 224 may open the contactor 220. Further, if fewer than all of the batteries 204 are in the discharge state, the battery control module 224 can transition additional ones of the batteries 204 and respective switching modules 300 to the discharge state to provide additional power to the load 212. Or, if one or more of the batteries 204 is not functioning properly, the corresponding switching module 300 can be turned OFF while remaining ones of the batteries 204 are still used to provide power to the load 212. In other words, while the battery control module 224 may open the contactor 220 to completely interrupt current flow to and from the batteries 204, the battery control module 224 may also simply turn ON and OFF individual ones of the switching modules 300.

If a sensed current and/or voltage corresponding to one of the batteries 204 changes polarity (e.g., from positive to negative or from negative to positive), the battery control module 224 transitions to the charge state. In the charge state, the battery control module 224 turns the semiconductor switch 304 OFF and the semiconductor switch 308 ON, and current is able to flow from the load 212 to the battery 204 through the switching module 300 (i.e., through the semiconductor switch 308 and the diode 312). Accordingly, in the charge state, the load 212 is used to charge the batteries 204. While in the charge state, the battery control module 224 continues to monitor current and/or voltage, and may selectively shut down one or more strings (e.g., turn off all semiconductor switches corresponding to one or more of the batteries 204, and/or open the contactor 220) if the current and/or voltage are determined to be outside of a first or second predetermined range. Further, if the sensed current and/or voltage again changes polarity (e.g., back from negative to positive, or from positive to negative), the battery control module 224 may determine that charging is complete and transition back to the discharge state.

In the stop state, the battery control module 224 opens (i.e., turns OFF) the contactor 220 to interrupt current to and from the batteries 204 if the current and/or voltage are outside of the second predetermined range. Further, the battery control module 224 may also simply turn OFF both of the semiconductor switches 304 and 308 in one or more of the switching modules 300 to interrupt current to and from selected ones of the batteries 204 if the current and/or voltage is outside of the first predetermined range.

In other implementations, the switching module 304 may only include a single semiconductor switch that is bi-directional instead of the first and second semiconductor switches 304 and 308. For example, in a first state (i.e., ON), the bi-directional semiconductor switch only allows current in a first direction. Conversely, in a second state (i.e., OFF), the bi-directional semiconductor switch only allows current in a second direction.

Figure 4:
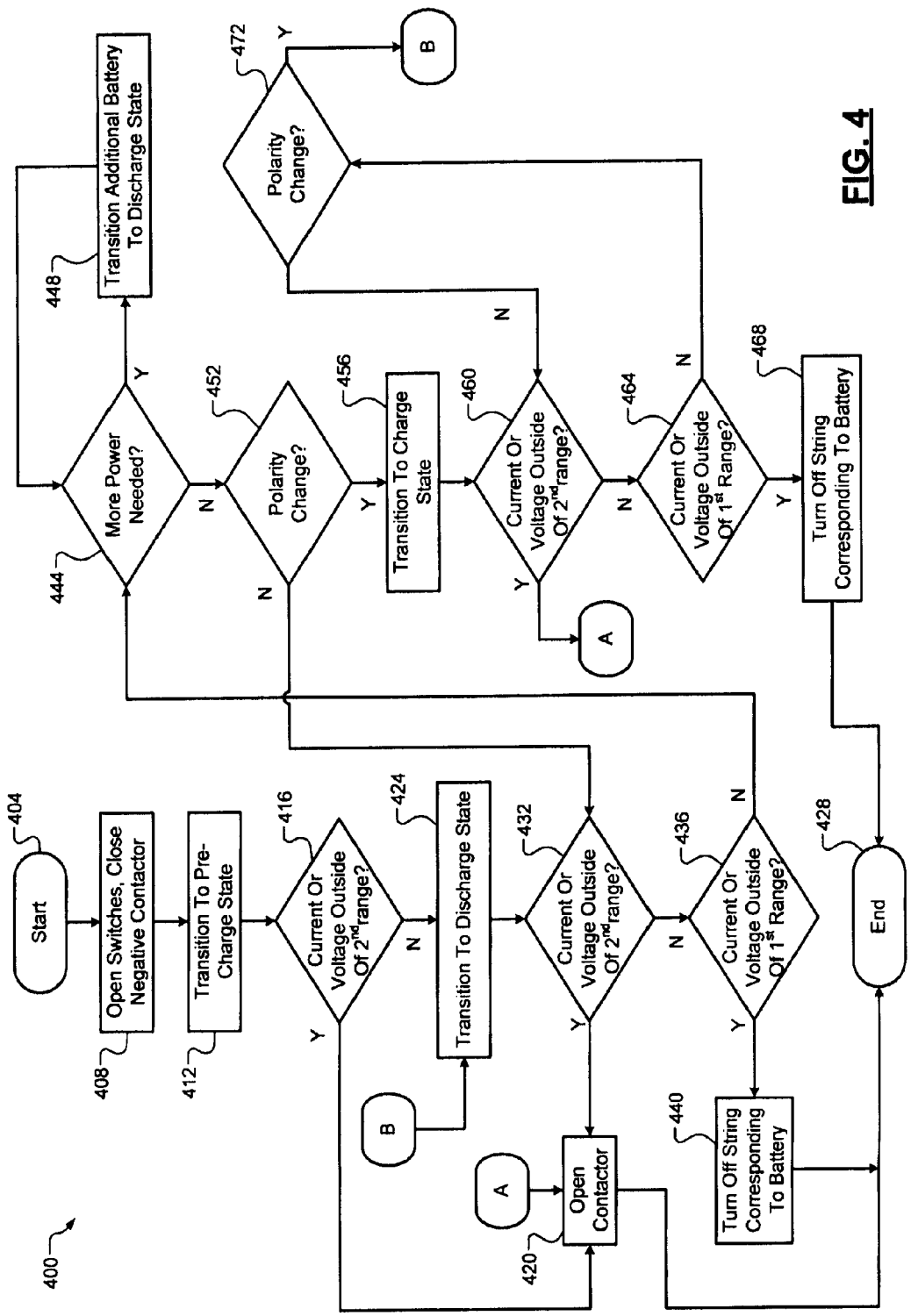
FIG. 4 illustrates a battery control method according to the principles of the present disclosure.

Referring now to FIG. 4, a battery control method 400 begins at 404. At 408, the method 400 opens charging and discharging semiconductor switches and closes a negative contactor of a battery pack. At 412, the method 400 closes a pre-charge semiconductor switch. In other words, the method 412 transitions to a pre-charge state. At 416, the method 400 determines whether a current and/or a voltage corresponding to a battery is outside of a second predetermined range. If true, the method 400 continues to 420. If false, the method continues to 424. At 420, the method 400 opens a contactor and transitions to a stop state, and ends at 428.

At 424, the method 400 transitions the battery to a discharge state after a predetermined per-charge time. At 432, the method 400 determines whether the current and/or voltage corresponding to the battery is outside of the second predetermined range. If true, the method 400 continues to 420. If false, the method continues to 436. At 436, the method 400 determines whether the current and/or voltage corresponding to the battery is outside of a first predetermined range. If true, the method 400 continues to 440. If false, the method 400 continues to 444. At 440, the method 400 turns off a string corresponding to the battery and ends at 428. At 444, the method 400 determines whether more power is needed. If true, the method 400 continues to 448. If false, the method 400 continues to 452. At 448, the method 400 transitions one or more additional batteries to the discharge state.

At 452, the method 400 determines whether a polarity of the current and/or voltage changes. If true, the method 400 continues to 456. If false, the method 400 continues to 432. At 456, the method 400 transitions to a charge state. At 460, the method 400 determines whether the current and/or voltage corresponding to the battery is outside of the second predetermined range. If true, the method 400 continues to 420. If false, the method continues to 464. At 464, the method 400 determines whether the current and/or voltage corresponding to the battery is outside of the first predetermined range. If true, the method 400 continues to 468. If false, the method 400 continues to 472. At 468, the method 400 turns off a string corresponding to the battery and ends at 428. At 472, the method 400 determines whether the polarity changes. If true, the method 400 continues to 424. If false, the method 400 continues to 460.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module and/or circuit may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A battery pack for an electric vehicle, comprising:
a first battery arranged in parallel with a load of the electric vehicle;
a second battery arranged in parallel with the first battery and the load;
a first semiconductor switching module arranged in series with the first battery, the first semiconductor switching module arranged to selectively allow current flow from the first battery to the load and from the load to the first battery, the first semiconductor switching module including a first semiconductor switch arranged in parallel with a first diode, and a second semiconductor switch arranged in series with the first semiconductor switch and in parallel with a second diode;
a second semiconductor switching module arranged in series with the second battery, the second semiconductor switching module arranged to selectively allow current flow from the second battery to the load and from the load to the second battery, the second semiconductor switching module including a third semiconductor switch arranged in parallel with a third diode, and a fourth semiconductor switch arranged in series with the third semiconductor switch and in parallel with a fourth diode; and
a battery control module that selectively turns on and off the first semiconductor switching module and the second semiconductor switching module.

2. The battery pack of claim 1, wherein:
the first semiconductor switch is configured to allow current flow from the first battery to the load to power the load in a first state, and to allow current flow from the load to the first battery to charge the first battery in a second state; and
the second semiconductor switch is configured to allow current flow from the second battery to the load to power the load in the first state, and to allow current flow from the load to the second battery to charge the second battery in the second state.

3. The battery pack of claim 1, wherein:
the battery control module opens the first semiconductor switch and closes the second semiconductor switch to charge the first battery, closes the first semiconductor switch and opens the second semiconductor switch to power the load using the first battery, opens the third semiconductor switch and closes the fourth semiconductor switch to charge the second battery, and closes the third semiconductor switch and opens the fourth semiconductor switch to power the load using the second battery.

4. The battery pack of claim 1, wherein the battery control module selectively opens each of the first semiconductor switch and the second semiconductor switch to turn off the first semiconductor switching module, and selectively opens each of the third semiconductor switch and the fourth semiconductor switch to turn off the second semiconductor switching module.

5. The battery pack of claim 1, wherein:
the battery control module opens and closes the first semiconductor switch and the second semiconductor switch independently of opening and closing the third semiconductor switch and the fourth semiconductor switch.

6. The battery pack of claim 1, wherein the first semiconductor switching module includes a fifth semiconductor switch arranged in parallel with the first semiconductor switch and the second semiconductor switch, and in series with a resistor.

7. The battery pack of claim 6, wherein the battery control module selectively closes the fifth semiconductor switch and opens the first semiconductor switch and the second semiconductor switch to pre-charge the battery pack using the first battery, the fifth semiconductor switch, and the resistor.

8. A battery pack for an electric vehicle comprising:
a first battery arranged in parallel with a load of the electric vehicle;
a second battery arranged in parallel with the first battery and the load;
a first semiconductor switching module arranged in series with the first battery, the first semiconductor switching module arranged to selectively allow current flow from the first battery to the load and from the load to the first battery;
a second semiconductor switching module arranged in series with the second battery, the second semiconductor switching module arranged to selectively allow current flow from the second battery to the load and from the load to the second battery;
a battery control module that selectively turns on and off the first semiconductor switching module and the second semiconductor switching module;
a current sensor arranged in series between the load and the first semiconductor switching module and the second semiconductor switching module; and
a contactor arranged in series between the load and the current sensor.

9. The battery pack of claim 8, wherein the battery control module selectively turns on and off the first semiconductor switching module and the second semiconductor switching module and selectively opens and closes the contactor based on a sensed current provided by the current sensor.

10. A method of operating a battery pack for an electric vehicle, comprising:
arranging a first battery in parallel with a load of the electric vehicle;
arranging a second battery in parallel with the first battery and the load;
arranging a first semiconductor switching module in series with the first battery to selectively allow current flow from the first battery to the load and from the load to the first battery, the first semiconductor switching module including a first semiconductor switch arranged in parallel with a first diode, and a second semiconductor switch arranged in series with the first semiconductor switch and in parallel with a second diode;

arranging a second semiconductor switching module in series with the second battery to selectively allow current flow from the second battery to the load and from the load to the second battery, the second semiconductor switching module including a third semiconductor switch arranged in parallel with a third diode, and a fourth semiconductor switch arranged in series with the third semiconductor switch and in parallel with a fourth diode; and selectively turning on and off the first semiconductor switching module and the second semiconductor switching module.

11. The method of claim 10, wherein:

the first semiconductor switch is configured to allow current flow from the first battery to the load to power the load in a first state, and to allow current flow from the load to the first battery to charge the first battery in a second state; and the second semiconductor switch is configured to allow current flow from the second battery to the load to power the load in the first state, and allows current flow from the load to the second battery to charge the second battery in the second state.

12. The method of claim 10, further comprising:

opening the first semiconductor switch and closing the second semiconductor switch to charge the first battery;

closing the first semiconductor switch and opening the second semiconductor switch to power the load using the first battery;

opening the third semiconductor switch and closing the fourth semiconductor switch to charge the second battery; and closing the third semiconductor switch and opening the fourth semiconductor switch to power the load using the second battery.

13. The method of claim 10, further comprising:

selectively opening each of the first semiconductor switch and the second semiconductor switch to turn off the first semiconductor switching module; and selectively opening each of the third semiconductor switch and the fourth semiconductor switch to turn off the second semiconductor switching module.

14. The method of claim 10, further comprising:

opening and closing the first semiconductor switch and the second semiconductor switch independently of opening and closing the third semiconductor switch and the fourth semiconductor switch.

15. The method of claim 10, wherein the first semiconductor switching module includes a fifth semiconductor switch arranged in parallel with the first semiconductor switch and the second semiconductor switch, and in series with a resistor.

16. The method of claim 15, further comprising:

selectively closing the fifth semiconductor switch and opening the first semiconductor switch and the second semiconductor switch to pre-charge the battery pack using the first battery, the fifth semiconductor switch, and the resistor.

17. A method of operating a battery pack for an electric vehicle comprising:

arranging a first battery in parallel with a load of the electric vehicle;

arranging a second battery in parallel with the first battery and the load;

arranging a first semiconductor switching module in series with the first battery to selectively allow current flow from the first battery to the load and from the load to the first battery;

arranging a second semiconductor switching module in series with the second battery to selectively allow current flow from the second battery to the load and from the load to the second battery;

selectively turning on and off the first semiconductor switching module and the second semiconductor switching module;

arranging a current sensor in series between the load and the first semiconductor switching module and the second semiconductor switching module; and arranging a contactor in series between the load and the current sensor.

18. The method of claim 17, further comprising:

selectively turning on and off the first semiconductor switching module and the second semiconductor switching module and selectively opening and closing the contactor based on a sensed current provided by the current sensor.

* * * * *